United States Patent
Fountain (10) Patent No.: US 11,445,714 B2
(45) Date of Patent: Sep. 20, 2022

(54) SEGMENTED ENTRY PORT FOR SPECIMEN CONTAINMENT

(71) Applicant: Thomas Fountain, St. James (BB)

(72) Inventor: Thomas Fountain, St. James (BB)

( * ) Notice: Subject to any disclaimer, the term of this patent is extended or adjusted under 35 U.S.C. 154(b) by 507 days.

(21) Appl. No.: 16/382,417

(22) Filed: Apr. 12, 2019

(65) Prior Publication Data

US 2020/0107531 A1    Apr. 9, 2020

Related U.S. Application Data

(60) Provisional application No. 62/743,530, filed on Oct. 9, 2018.

(51) Int. Cl.
| | | |
|---|---|---|
| *B01L 3/00* | (2006.01) | |
| *A01K 97/20* | (2006.01) | |
| *A01K 1/03* | (2006.01) | |
| *B65D 25/20* | (2006.01) | |

(52) U.S. Cl.
CPC .............. *A01K 97/20* (2013.01); *A01K 1/031* (2013.01); *B01L 3/00* (2013.01); *B65D 25/20* (2013.01); *B01L 2200/08* (2013.01); *B01L 2300/041* (2013.01)

(58) Field of Classification Search
CPC ... B01L 3/00; B01L 2200/08; B01L 2300/041
USPC ......... 73/863.23, 863, 864.91; 422/560, 561, 422/547
See application file for complete search history.

(56) References Cited

U.S. PATENT DOCUMENTS

| | | | | |
|---|---|---|---|---|
| 4,852,584 A | * | 8/1989 | Selby .................. | B01L 3/00 600/573 |
| 5,307,694 A | * | 5/1994 | Nolte ................. | G01N 1/44 73/864.91 |
| 5,744,098 A | * | 4/1998 | Kratzer .............. | G01N 33/4905 422/512 |
| 7,328,628 B2 | * | 2/2008 | Laugharn, Jr. ......... | G01N 1/286 73/864.91 |
| 9,138,747 B2 | * | 9/2015 | Williams ............... | B65D 43/02 |
| 9,790,462 B2 | * | 10/2017 | Pflanz .................... | C12M 47/02 |
| D831,844 S | * | 10/2018 | Langhoff .................. | B01L 3/00 D24/224 |
| 10,966,690 B2 | * | 4/2021 | Kopoian ............... | A61B 10/007 |
| 2004/0069076 A1 | * | 4/2004 | Gamble ................ | G01N 35/10 73/864.91 |
| 2010/0037681 A1 | * | 2/2010 | Hart ....................... | G01M 3/022 73/40.5 R |
| 2015/0209017 A1 | * | 7/2015 | Fleming .................... | B01L 3/50 73/864.91 |

* cited by examiner

*Primary Examiner* — Jacob K Ackun
(74) *Attorney, Agent, or Firm* — Andrew Morabito (57) ABSTRACT

The present device is a specimen containment unit comprising; a container, wherein the container has a first portion of a locking mechanism positioned distal to an opening, and a funnel having a base and a plurality of segments attached to the base and a second portion of a locking mechanism integrated into the base, wherein the segments protrude a predetermined distance and angle from the base, wherein the first portion of the locking mechanism is designed to mate with the second portion of the locking mechanism to secure the funnel to the container.

13 Claims, 9 Drawing Sheets

SEGMENTED ENTRY PORT FOR SPECIMEN CONTAINMENT

This application is a continuation (and claims the benefit of priority under 35 USC 120) of U.S. application No. 62/743,530 filed Oct. 9, 2018. The disclosure of the prior applications is considered part of (and is incorporated by reference in) the disclosure of this application.

BACKGROUND OF THE INVENTION

The invention is a device applicable to the collection of fish and other animal specimens, and more particularly to a device for collection of fish and other specimen where the user needs some protection from the specimens being collected.

Segmented funnels work by being normally closed together but when an object is pushed into the funnel from the open end, the segments are forced apart to permit the object to pass. Once the object has passed the segments return to the normally closed position. If an object is pushed into the funnel from its closed end the segments tend to close more tightly and prevent passage in that direction.

The above characteristic means that segmented funnels work effectively as one-way ports and are in common use for containment units that can be found in forms ranging from purpose-made segmented funnels to a variety of homemade alternatives including standard fluid funnels that are partially sliced into segments or simple cross-cuts in the base of used water containers.

A drawback of the commonly used segmented funnel is that the catching mechanism can snag on the funnel parts on withdrawal, either when the tips of the funnel meet protruding parts of the mechanism, or when the mechanism gets wedged between adjacent segments of the funnel. In either case the usual response of the user is to pull harder and expect the flexibility of the funnel to release the mechanism, which shortens the life of the funnel. The invention improves the segmented funnel by providing features that help to prevent both problems.

A drawback of some containment units can be handling strap attachments that do not adequately protect the user from the specimens, can shorten the life of the container, or add weight. The invention provides a means of connecting cords to the container that is secure, safe, simple and suitable for thin walled containers. Such connections can be used in handling the assembled containment unit and for mounting the entry device onto the container.

This invention improves on existing designs of containment unit by integrating the segmented funnel with a mounting part that can be mounted quickly and securely to a variety of containers that can be adapted for the purpose using only simple tools. This includes the possible use of containers that have been re-purposed from locally available sources such as old paint or water containers thereby reducing environmental impact. The invention can be embodied as a kit where users provide and adapt containers themselves.

BRIEF SUMMARY OF THE INVENTION

The various alternate embodiments of the mounting method provide for quick and secure mounting of the device to the container and include an embodiment that uses a bayonet action where the device is placed onto the container and rotated to engage mounting elements that hold the device in place. The mounting part may also be embodied as being split laterally into two or more parts which are then held together over or within the container opening. Another embodiment of the mounting method can be to hold the device directly onto the container. In each case the retainers used to hold the mounting part(s) onto the container can be of the quick-release type such as clips, elasticated loops, pins or hook and loop straps.

The problem associated with withdrawal of the catching mechanism, where the parts of the mechanism get wedged between adjacent segments of the funnel, is resolved by cutting a notch out of adjacent segments so that the mechanism will be released on encountering the notch.

The problem associated with withdrawal of the catching mechanism, where the tips of funnel snag protruding parts of the mechanism, is resolved by shaping the segments so that their tips are extended further into the container and away from the centerline of the funnel to give a lead-in to guide, rather than snag, the mechanism.

The problem associated with handling straps, where their attachment does not adequately protect the user from the specimens, can shorten the life of the container, or add weight is resolved by a simple but effective cord connection that includes a washer on the inside of the container to both provide stress relief to the container wall and to 'plug' the hole made to pass the cord through.

DETAILED DESCRIPTION OF THE INVENTION

The present invention provides a segmented funnel to allow for manufacturing considerations and variation in container types. The single part embodiment of the device includes all segments and mounting elements needed and is simple in concept but would require a significant investment in tooling although this can be mitigated by bonding or welding the parts together, whereas the embodiment having individual segments may be a less costly investment but would require more components and assembly. Other embodiments of the device use a separate, multi-segmented funnel in one instance and a longitudinally split funnel & mounting part in another instance.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, and as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements or use of a "negative" limitation.

Figure 1:
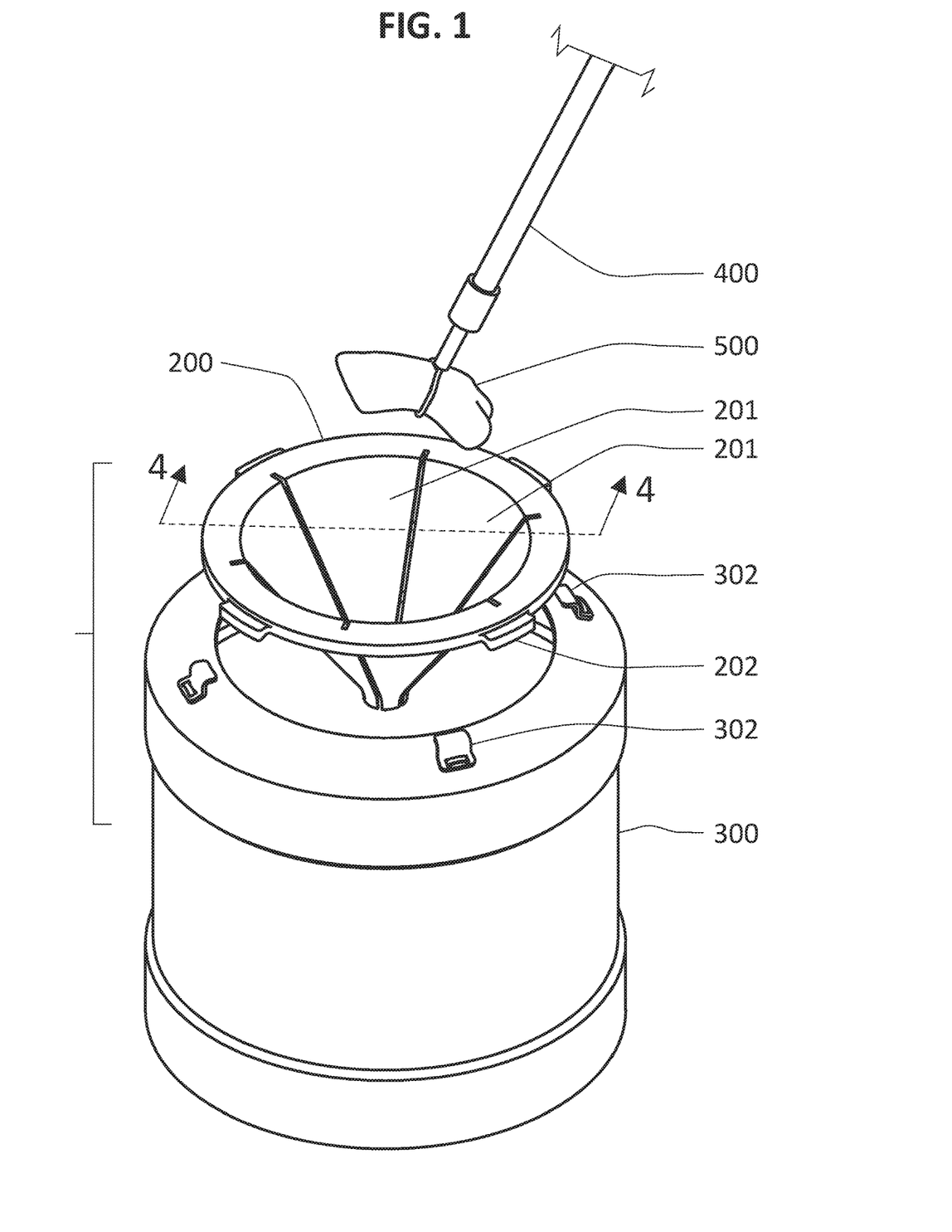
FIG. 1 depicts an isometric of the specimen container unit, in accordance with one embodiment of the present invention.
Figure 2:
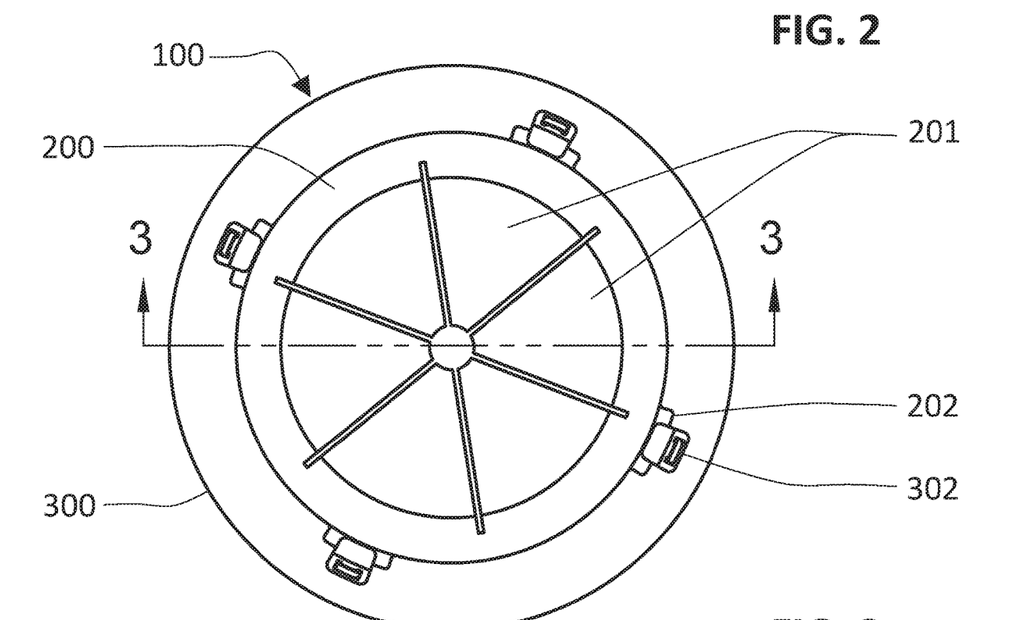
FIG. 2 depicts a top view of a specimen container unit, in accordance with one embodiment of the present invention.
Figure 3:
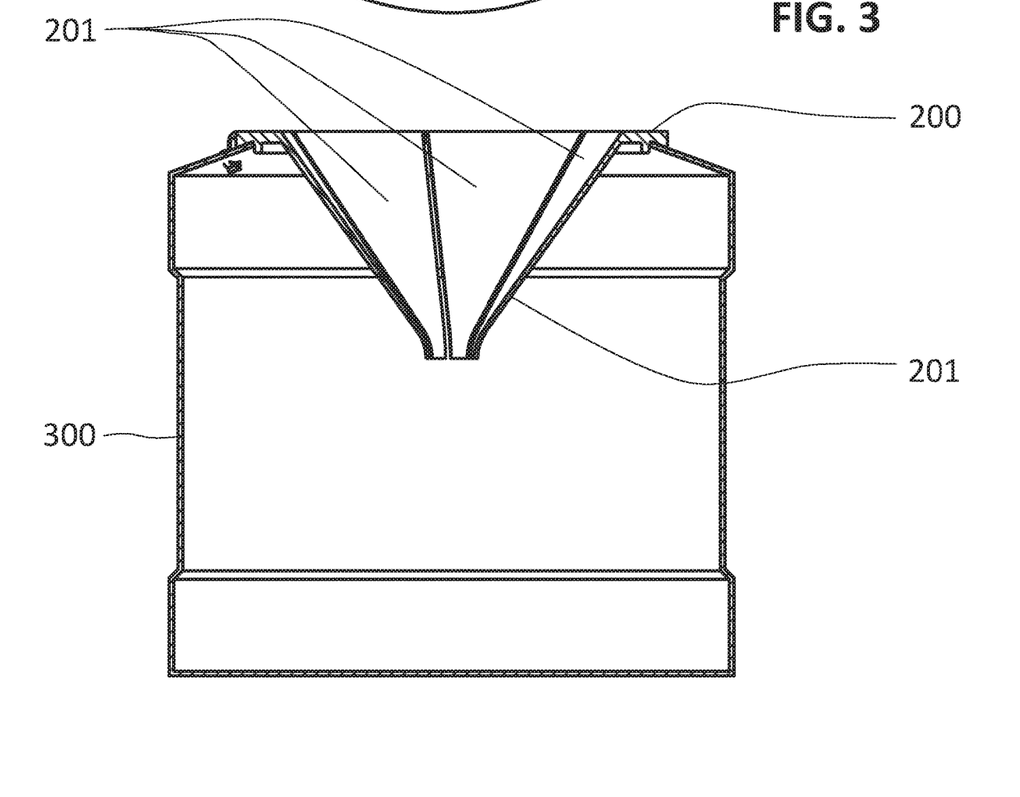
FIG. 3 depicts a section view of the specimen container unit, in accordance with one embodiment of the present invention.

FIGS. 1-3 depicts a specimen container unit 100, in accordance with one embodiment of the present invention. The specimen container unit 100 is comprised of a funnel 200 and a container 300. In the depicted embodiment, the funnel 200 has an integrated locking mechanism 202, and the container 300 has an integrated corresponding locking mechanism 302 to allow the funnel 200 to be secured to the container 300.

The funnel 200 has a plurality of segments 201, which allow for an opening at the lower end of the funnel 200 to increase in diameter when an object or specimen passes through the funnel which has a size greater than that of the opening at the lower end of the funnel. The funnel 200 has a height which is less than that of the container 300.

In some embodiments, it is anticipated that the container 300 can be made from a re-purposed plastic container such as a used water or paint container that has been modified to have a simple cutout to facilitate mounting the funnel 200 to the container 300. In some embodiments, the locking mechanisms 302 are integrated into the container 300. In additional embodiments, the locking mechanisms 302 are secured to the container 300 to match with the locking mechanisms 202 of the funnel 200.

The funnel 200 and the container 300 may be made from, but not limited to polyethylene, polyethylene terephthalate, high-density polyethylene, polypropylene, polystyrene, polyvinyl chloride, polyurethane, poly carbonate, polybutylene terephthalate, acrylonitrile styrene acrylate, acrylics, aluminum, steel, cooper, various other metals, a combination of plastics and metals, or the like.

In the depicted embodiment, a catching/spearing device 400 is shown with a specimen 500 which is desired to be placed within the container 300, and remain in the container 300.

Figure 4:
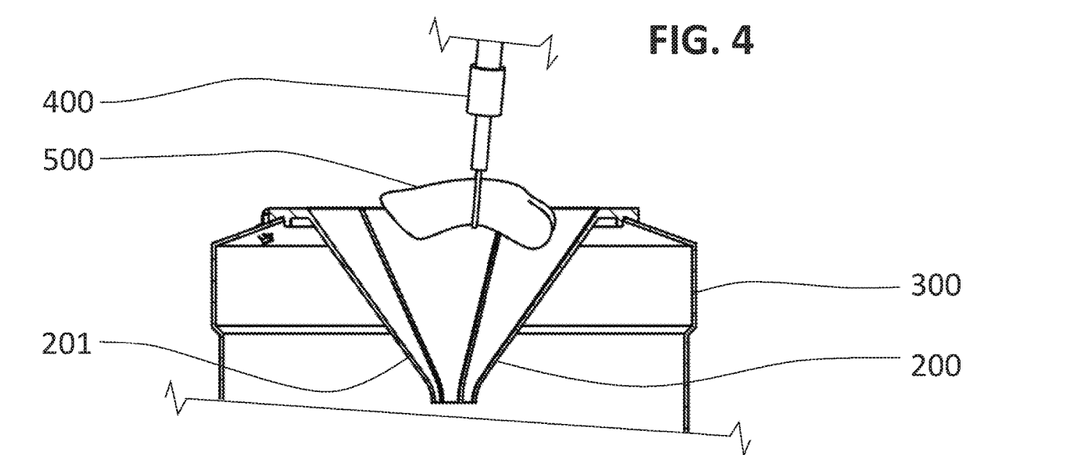
FIG. 4 depicts a section view of the specimen container in use unit, in accordance with one embodiment of the present invention.
Figure 5:
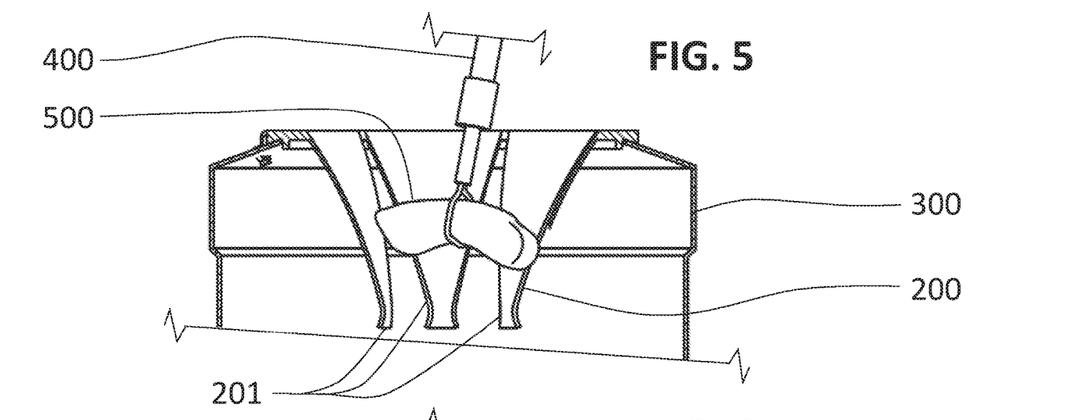
FIG. 5 depicts a section view of the specimen container in use unit, in accordance with one embodiment of the present invention.
Figure 6:
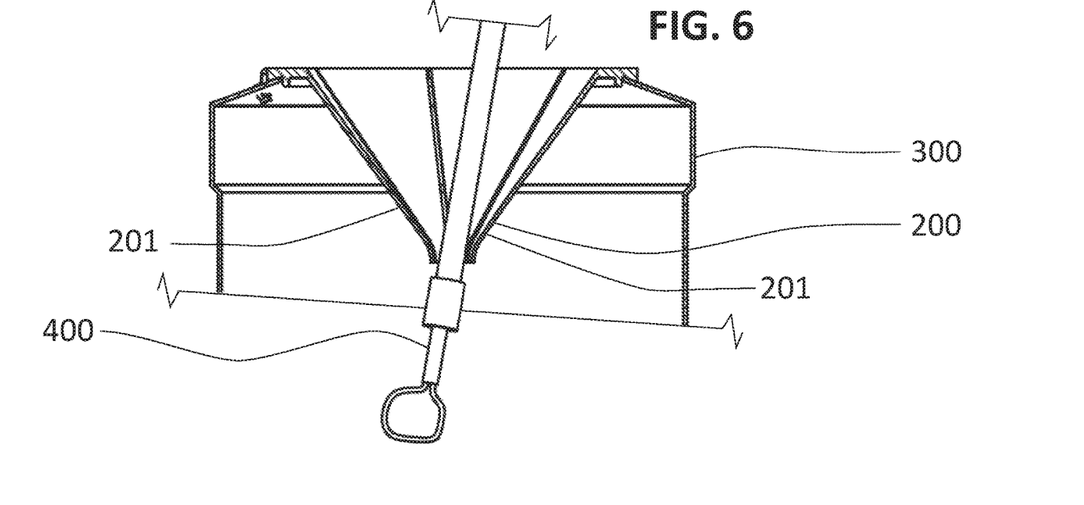
FIG. 6 depicts a section view of the specimen container in use unit, in accordance with one embodiment of the present invention.

FIGS. 4-6 depict the process of inserting a specimen 500 into the container 300, in accordance with one embodiment of the present invention. First the specimen is inserted into the top end of the funnel 200. As the specimen 500 passes through the funnel 200 and the specimen 500 is larger than the opening of the funnel 200, the segments 201 of the funnel expand outward to increase the size of the opening, until the specimen 500 passes completely through the funnel 200, at which time the segments 201 return to their original positions. This allows the specimen 500 to be inserted into the container 300, but once the specimen 500 is within the container 300, the funnel 200 has retracted to its original size, and the specimen 500 is unable to leave the container 300. In the depicted embodiment, the opening in the funnel is approximately the same size as the catching device 400.

FIGS. 7-13 depict various embodiments of the funnel 200 and the locking mechanisms, in accordance with embodiments of the present invention.

Figure 7:
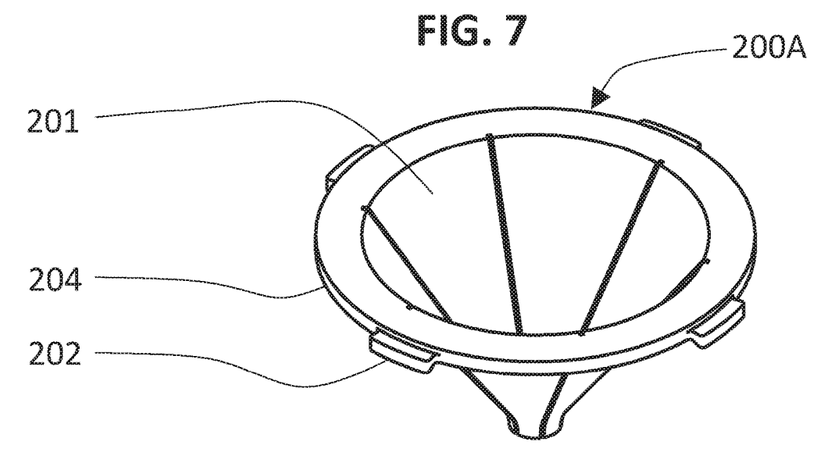
FIG. 7 depicts an isometric view of a funnel, in accordance with one embodiment of the present invention.

FIG. 7 depicts a first embodiment of the funnel 200A where the locking mechanism 202 is integrated into a base 204 and have a reciprocal locking mechanism integrated into the container 300. The locking mechanism 202 is integrated into the base 204.

Figure 8:
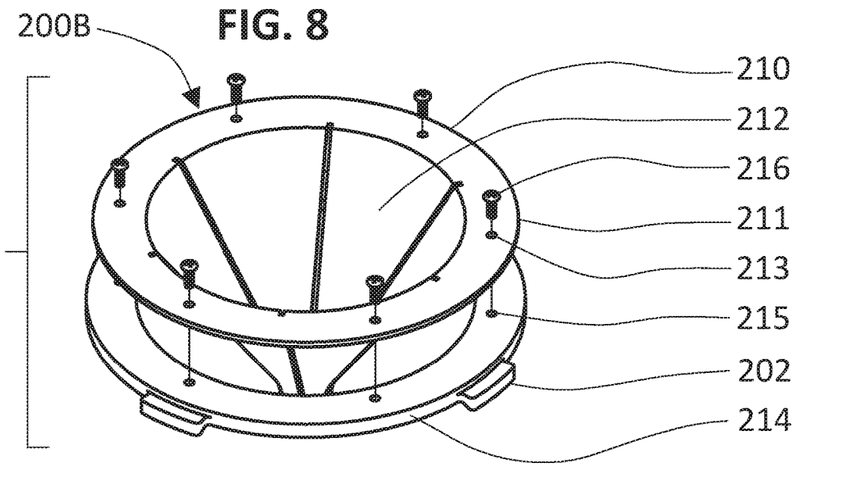
FIG. 8 depicts an isometric view of a funnel, in accordance with another embodiment of the present invention.

FIG. 8 depicts a second embodiment of the funnel 200B, where a first portion 210 consists of an outer rim with segments 212 integrated within the ring 211, and the ring 211 has a plurality of openings 213. A second portion 214 which is a ring has a plurality of openings 215, and the first portion 210 is secured to the second portion 214 through a fastener 216.

Figure 9:
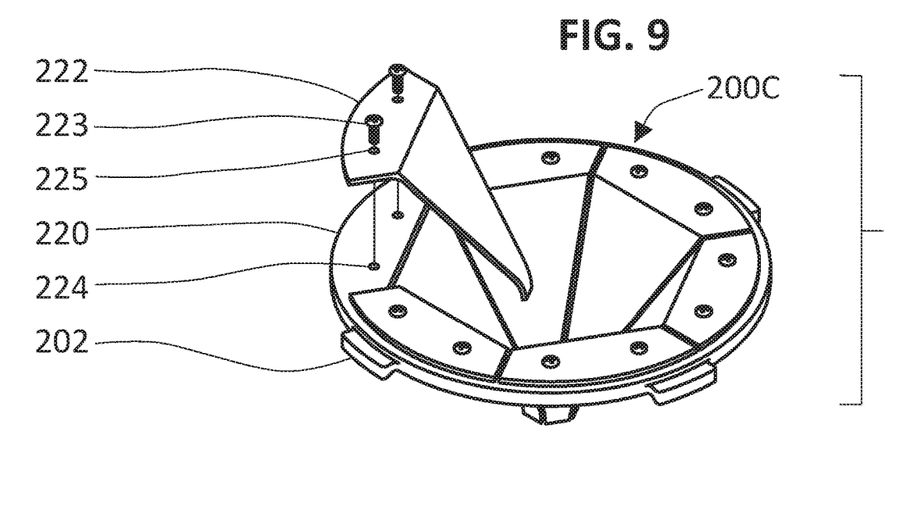
FIG. 9 depicts an isometric view of a funnel, in accordance with another embodiment of the present invention.

FIG. 9 depicts a third embodiment of the funnel 200C. A first component 220 is a base, wherein the base 220 has an opening in the center and a plurality of locking mechanism 202 integrated with an exterior edge. A plurality of openings 224 are positioned along the base 220 in predetermined locations. A plurality of segments 222 are secured to the base 220, by fastening the segments 222 to the base 220. In the depicted embodiment, the segments 222 have openings 225 which align with the openings 224 and a fastener 223 is used to secure the two parts together. In additional embodiments, various types of fasteners or fastening methods can be used.

Figure 10:
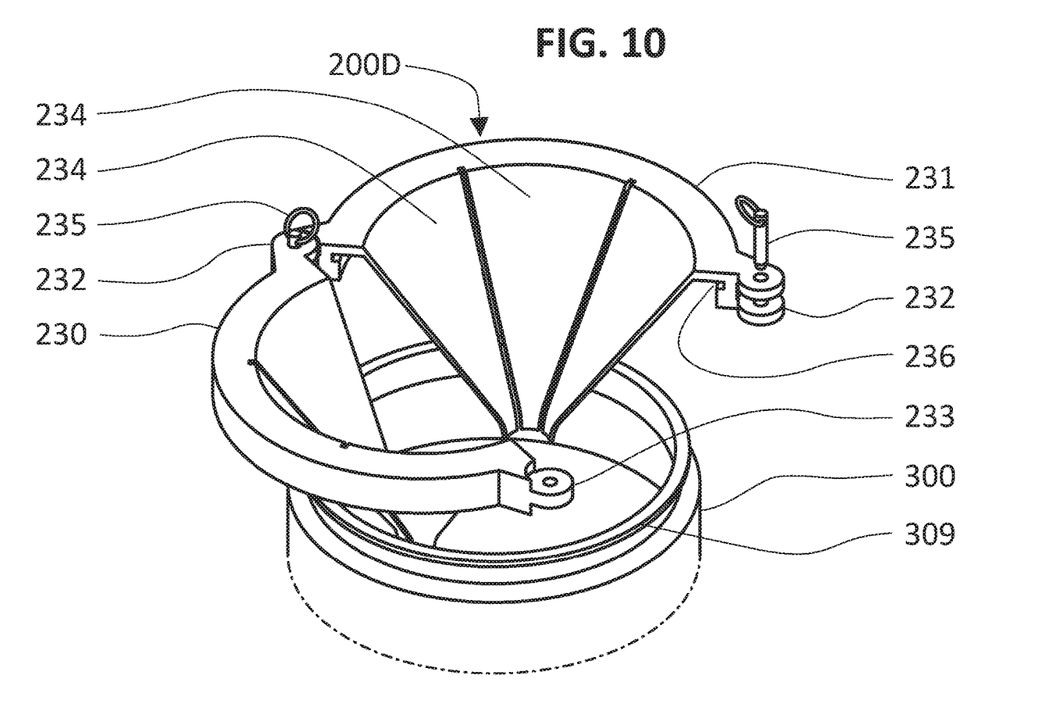
FIG. 10 depicts an isometric view of the funnel, in accordance with another embodiment of the present invention.

FIG. 10 depicts a fourth embodiment of the funnel 200D, wherein the funnel 200D is comprised of a first half 230 and a second half 231. The halves 230 and 231 are designed to be secured together at the mating points 232 and 233. The two halves 230 and 231 are able to connect to one another at the mating points 232 and 233. In the depicted embodiment, the mating points 232 and 233 further require a fastener 235 to secure the two halves together. In the depicted embodiment, the fastener 234 is a quick release fastener. In additional embodiments, the locking mechanism 234 may be a pressure snap, latch, or various types of fasteners. In the depicted embodiment, each half has a groove 236 (or contour), which is designed to secure around a reciprocal groove 309 (or contour) of the container 300. This allows for the funnel 200D to securely fit to the container 300 without additional parts and allows for the remove of the funnel 200 to gain access to the entirety of the opening of the container 300.

Figure 11:
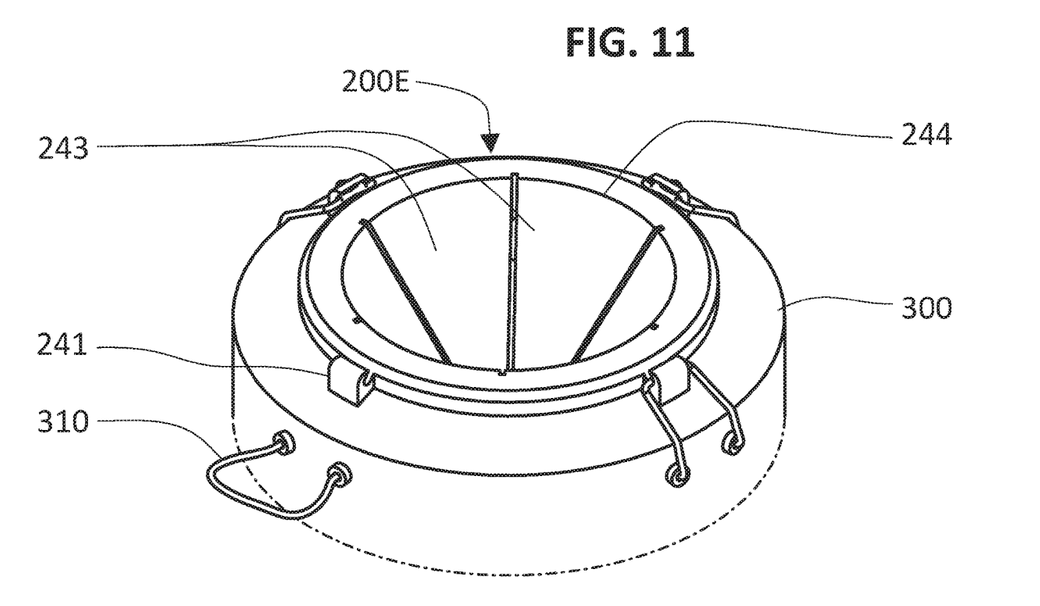
FIG. 11 depicts an isometric view of the funnel, in accordance with another embodiment of the present invention.

FIG. 11 depicts a fifth embodiment of the funnel 200E, where the funnel 200E has a unitary design, with a plurality of hooks 241. The container 300 has a plurality of loops 310 which are designed to secure with the hooks 241 to secure the funnel 200E to the container 300. The segments 243 are integrated with the base 244.

Figure 12:
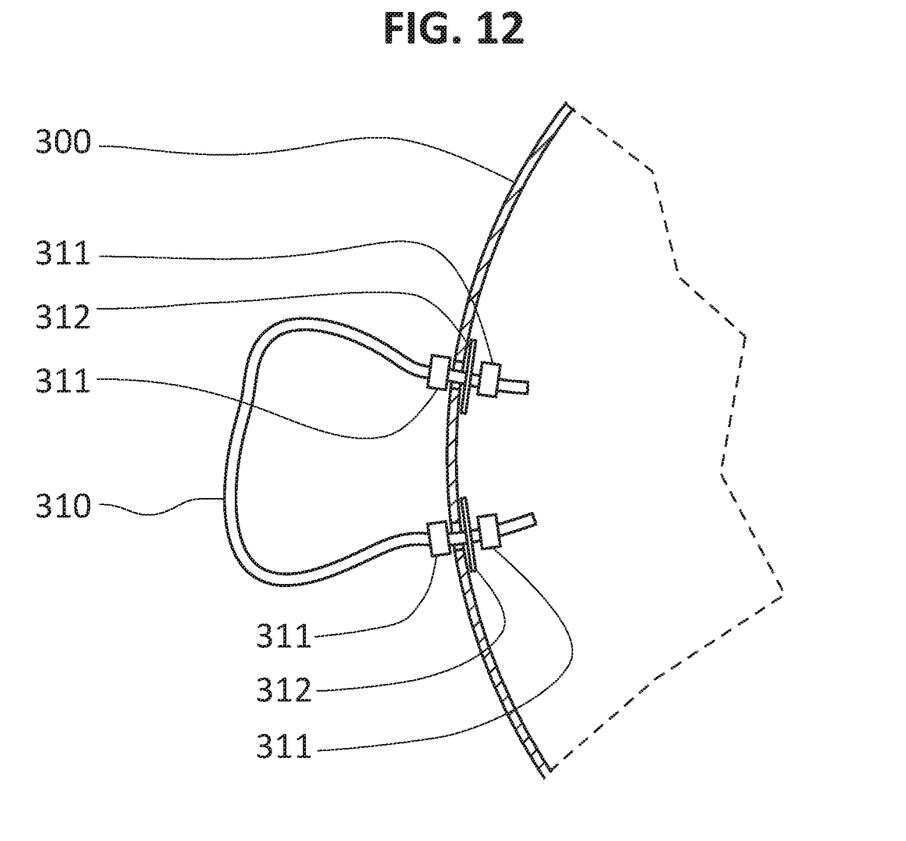
FIG. 12 depicts a section view of a mounting system for the specimen containment unit, in accordance with one embodiment of the present invention.

FIG. 12 depicted an embodiment of the loops 310. The loops 310 may be made from an elastic material and is secured to the container 300 by a portion of the loop 310 passing through the container 300. In the depicted embodiment, the loop 310 is secured to the container using locking mechanisms 311 positioned inside and outside of the container 300, and a disc 312 positioned on the inside of the container 300. The disc 312 is designed to prevent egress of spines or the items contained within the container. The disc 312 also assists in dissipating forces that could damage thin walled containers 300. In additional embodiments, the section of material of the loop 310 is knotted or crimped within the container 300 to hinder the loop 310 coming detached from the container 300.

Figure 13:
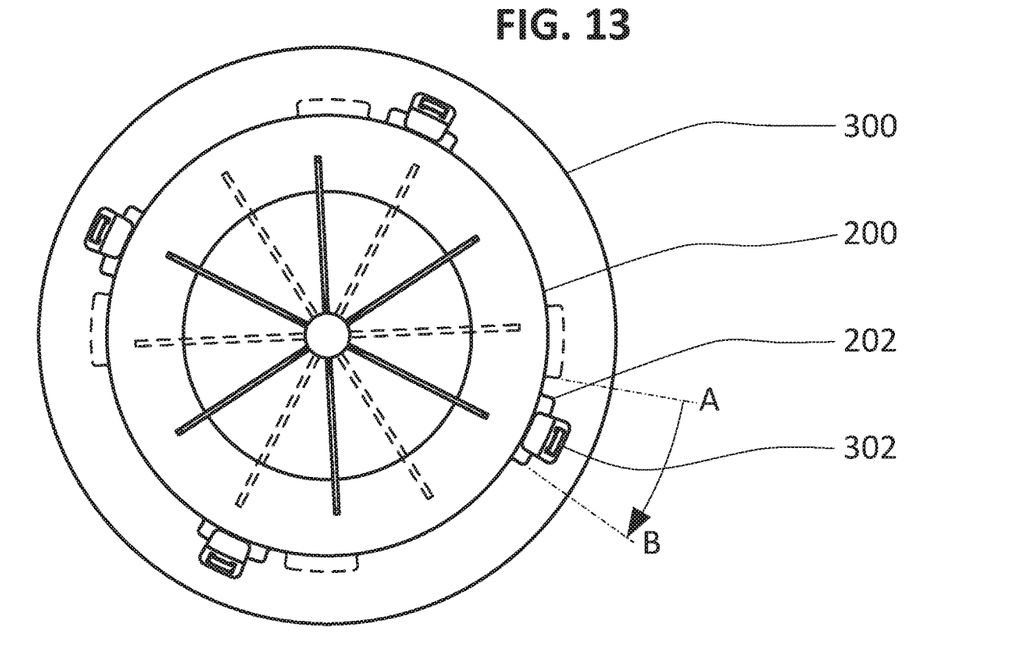
FIG. 13 depicts a top view of the funnel, in accordance with another embodiment of the present invention.

FIG. 13 depicts the embodiment of locking mechanism, where a bayonet style action is used to mount the funnel 200 to the container 300. The funnel 200 is designed to be rotated from a first position A to a second position B. When the funnel 200 is in the second position B, the components of the locking mechanism 202 of the funnel 200 are secured with the reciprocal components of the locking mechanism 302 of the container 300. The funnel 200 can be located in position B with a pin or indent (not shown) to prevent the funnel 200 from coming loose or returning to position A without the operator.

Figure 14:
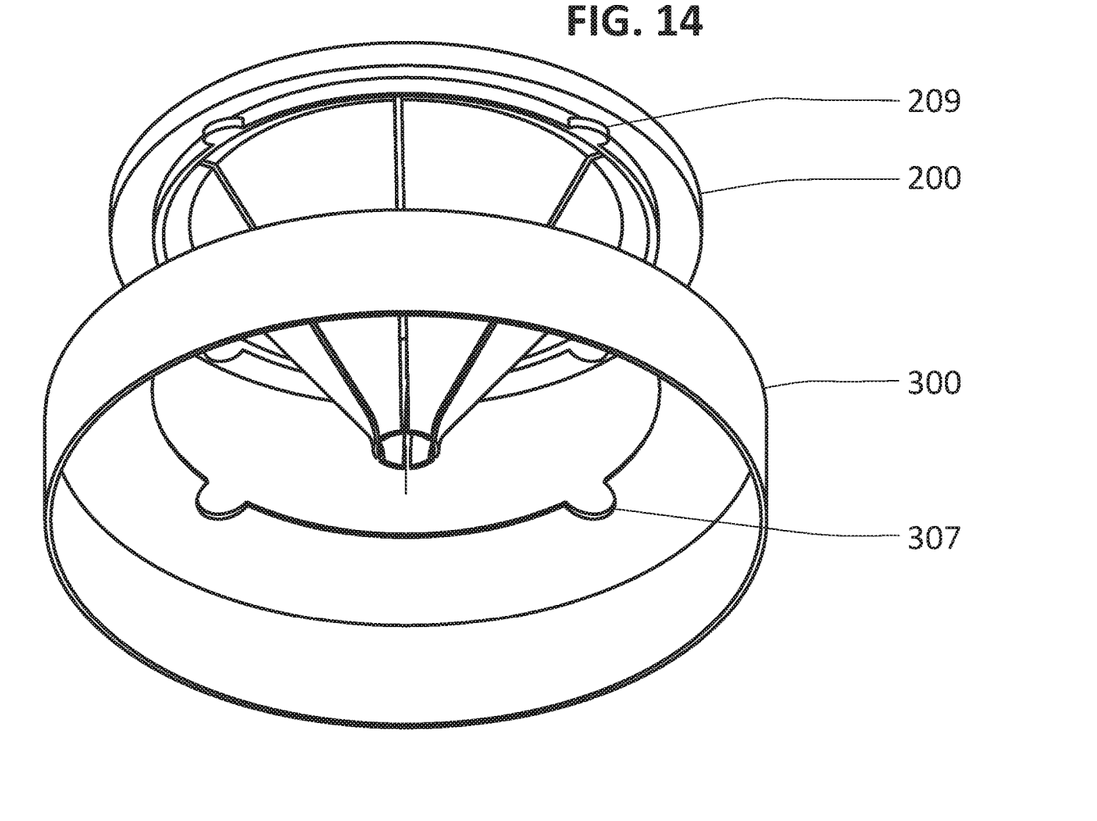
FIG. 14 depicts an isometric view of the funnel disassembled, in accordance with another embodiment of the present invention.
Figure 15:
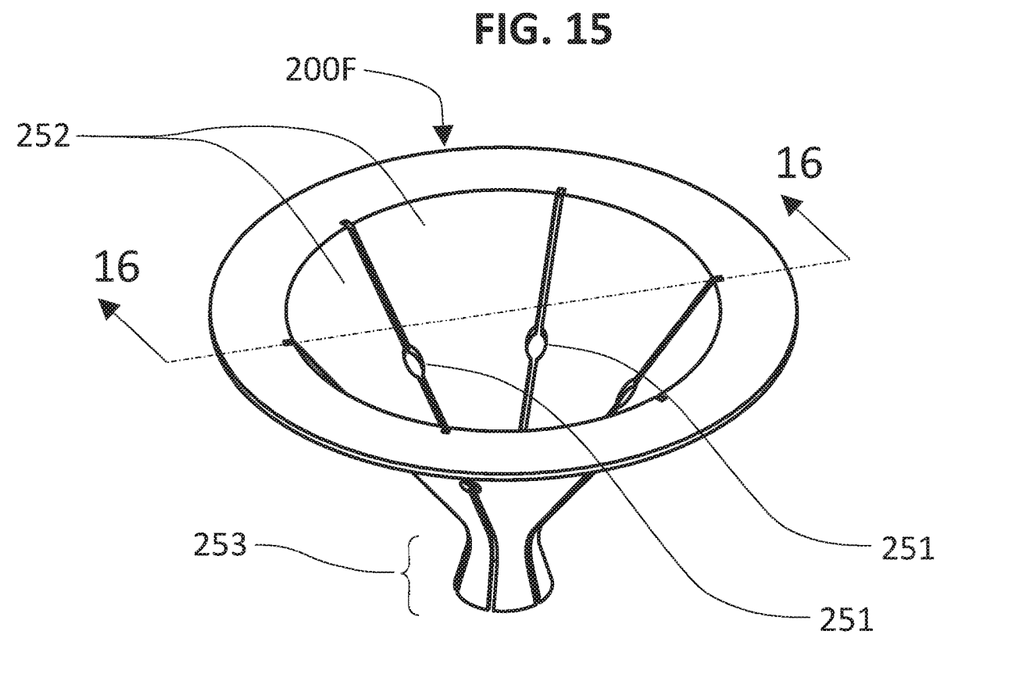
FIG. 15 depicts an isometric view of the funnel, in accordance with another embodiment of the present invention.
Figure 16:
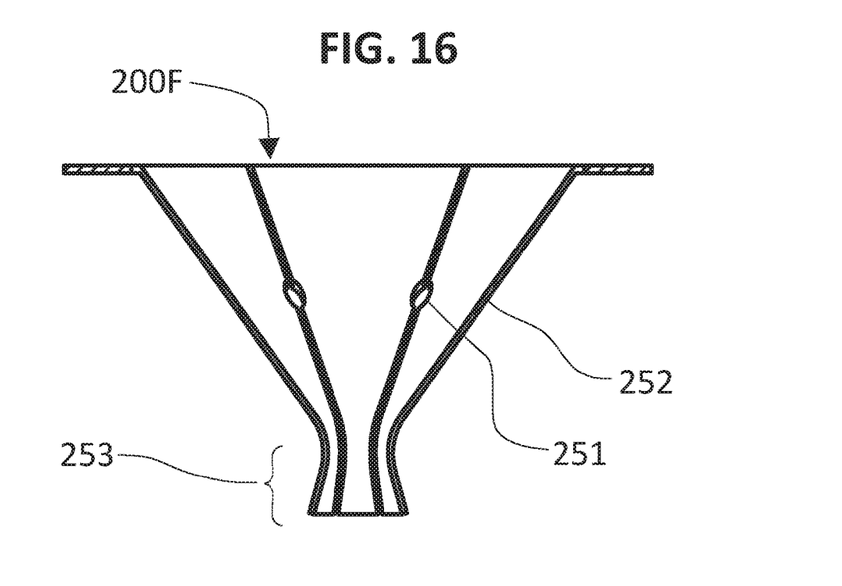
FIG. 16 depicts a section view of the funnel in FIG. 15, in accordance with another embodiment of the present invention.
Figure 17:
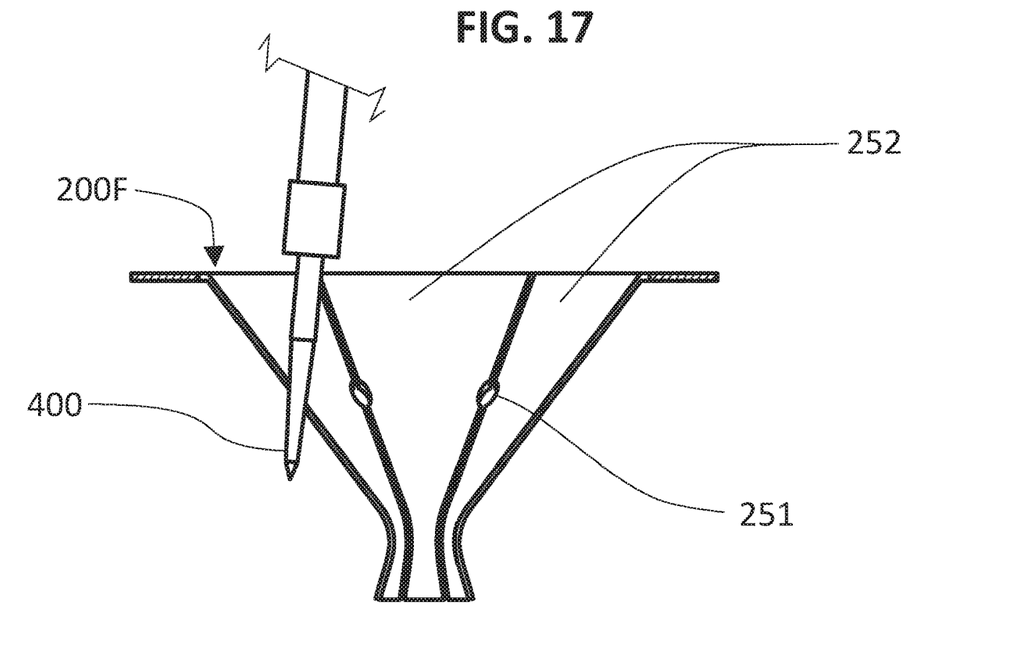
FIG. 17 depicts a section view of the funnel in FIG. 15, in accordance with another embodiment of the present invention.
Figure 18:
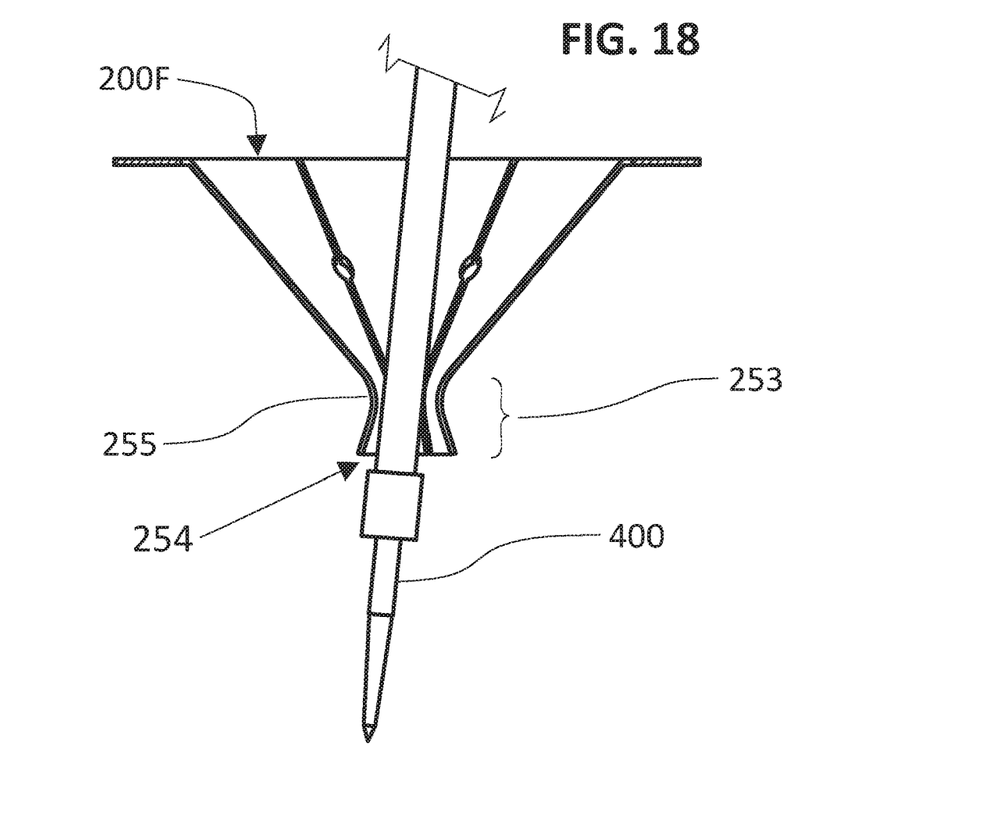
FIG. 18 depicts a section view of the funnel in FIG. 15, in accordance with another embodiment of the present invention.

FIG. 14 depicts another embodiment of a locking mechanism, in accordance with one embodiment of the present invention. The container 300 top edge has a plurality of cutouts 307, and the funnel 200 has a plurality of protrusions 209, wherein the protrusions 209 are sized to fit within the cutouts 307, and when the funnel 200 is rotated to a second position, the funnel 200 is secured to the container 300.

FIGS. 15-18 depicts another embodiment of the funnel 200, in accordance with another embodiment of the present invention. The funnel 200F has a plurality of notches 251 in each of the segments 252 a set distance from the top of the segments 252. This allows for an improved withdrawal process of the catching device 400. When the segments 252 do not have the notches 251, the catching device 400 may become wedged or stuck between the segments 252 when the operating is attempting to remove the catching device 400. The notches 251 allow for the segments 252 to retract to their original position as the catching device 400 is removed, and the notches 251 create an opening for the catching device 400 to pass through.

Additionally, the funnel 200F is designed to have a region of the funnel tip 253 that is reversed so that the funnel tip 253 has a wider opening at the end. This curvature at the funnel tip 253 assists in reducing the chances of the catching device 400 being caught on the funnel 200F when being removed. The funnel tip 253 may have various shapes and contours depending on the style of the catching device 400, and the specimen which are designed to be placed within the container 300. In the depicted embodiment, the funnel tip 253 has a diameter at 254 which is greater than the diameter at 255.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

The invention claimed is:

1. A specimen containment unit comprising;
    a container, wherein the container has a first portion of a locking mechanism positioned distal to an opening; and
    a funnel having a base and a plurality of segments attached to the base and a second portion of a locking mechanism integrated into the base, wherein the segments protrude a predetermined distance and angle from the base,
    wherein the first portion of the locking mechanism is designed to mate with the second portion of the locking mechanism to secure the funnel to the container.

2. The specimen containment unit of claim 1, wherein the funnel has a plurality of segments attached to the base, wherein the segments have substantially identical shapes.

3. The specimen containment unit of claim 1, wherein the segments are arranged in a nominally circular pattern to form a funnel whereby the segments are independent adjustable.

4. The specimen containment unit of claim 1, wherein the segments are able to be adjusted from a first position to a second position and retract from the second position to the first position upon the removal of a force acting upon the segment.

5. The specimen containment unit of claim 1, wherein the funnel is comprised of a first disc with the second portion of the locking mechanism, and a second disc having the plurality of segments integrated into the second disc, and the second disc is secured to the first disc through a plurality of fasteners.

6. The specimen containment unit of claim 1, wherein the funnel is comprised of a first disc with the second portion of the locking mechanism, and a plurality of individual segments attached to the first disc, wherein a funnel is formed.

7. The specimen containment unit of claim 1, wherein the funnel is comprised of a first half and a second half, wherein the first half has first mating point and a second mating point and a plurality of individual segments integrated with the first half, and the second half has a third mating point and a fourth mating point and a plurality of individual segments integrated with the second half, wherein the first mating point connects with the third mating point, and the second mating point connects with the fourth mating point.

8. The specimen container unit of claim 7, wherein the first half and the second half of the funnel have a groove, wherein the groove substantially matches a lip on the container, wherein the first half and second half of the funnel can be secured to the container by inserting the lip into the groove.

9. The specimen containment unit of claim 1, wherein the funnel has a plurality of hooks disposed along an edge, and the container has a plurality of loops attached to the container.

10. The specimen container unit of claim 9, wherein the plurality of loops are connect with the hooks, thereby securing the funnel to the container.

11. The specimen containment unit of claim 1, wherein the funnel is secured to the container by rotating the funnel from a first position to a second position, thereby engaging the locking mechanism.

12. The specimen containment unit of claim 1, wherein the funnel has an opening of a first diameter at a first end, an opening with a second diameter at a second end, and distal to the second end, an opening which is less than the second diameter at the second end.

13. The specimen containment unit of claim 1, wherein the segments of the funnel have a notch in each segment at substantially the same position along each segment, whereby openings are created between the segments.

* * * * *